UNITED STATES PATENT OFFICE.

FRANCOIS CHARLES ZAPFLE, OF NEW YORK, N. Y.

IMPROVEMENT IN FIRE-EXTINGUISHING COMPOUNDS.

Specification forming part of Letters Patent No. 182,508, dated September 19, 1876; application filed August 22, 1876.

*To all whom it may concern:*

Be it known that I, FRANCOIS CHARLES ZAPFLE, of the city of New York and State of New York, have invented a new and useful Compound called "Zapfle Fire-Extinguishing Compound," which compound is fully described in the following specification:

This invention relates to that class of compounds used to extinguish fires of every nature; and it consists in a composition formed by mixing the following ingredients: Hydrochloric acid, (pure, gaseous;) chloride of barium; carbonate of lime; crystallized alum, with potassa base; water.

To prepare the fire-extinguishing compound take forty parts hydrochloric acid; ten parts chloride of barium; twenty-eight parts carbonate of lime; five parts crystallized alum, with potassa base; seventeen parts water. Areometric degree, 35° Baumé.

Mode of preparation: In a large vat, or other receptacle of stone or pottery ware, pour the hydrochloric acid at 20° Baumé, which is to be purified by the addition of the chloride of barium at 90° Baumé. This results in eliminating the sulphuric acid found in the hydrochloric acid. Next pour in the carbonate of lime in sufficient quantity to neutralize the compound. At this stage draw off the preparation thus far formed, excluding the precipitated barium sulphate which remains in the bottom of the vat, and add thereto the crystallized alum, with potassa base, which freely dissolves in the preparation. The compound is then perfect, and ready to be drawn from the vat or receptacle and put into marketable packages for use.

I do not desire to limit myself to the precise manner of preparation, or to the exact proportion of ingredients herein set forth, as it is evident that any other of the well-known chemical ways of preparing the calcium chloride may be employed, and the proportions varied, according to the nature of the burning material against which it is to be thrown.

Mode of application in the extinguishment of fires and conflagrations, and effect: The compound is placed in the proportions hereinafter specified in either a fire-engine or extinguishing apparatus, and produces the following effect upon the burning mass: First, the freeing of hydrochloric-acid gas in sufficient quantity to smother the flames and to prevent the spread of the fire; second, the relative incombustibility which those parts of the burning mass acquire upon which the extinguishing acid has been brought in contact.

This compound is as easily applied as it is efficacious in subduing and extinguishing fires and conflagrations. All that is necessary is to pour the extinguishing acid into the fire-engine or into the extinguishing apparatus employed in the proportion of about twenty pounds of this solution to twenty-five gallons of water.

The strength of the solution may be increased, in order to obtain a greater result, whenever fires are to be dealt with of very combustible substances, such as oil, tar, tallow, &c.

This compound can be preserved for an indefinite time in a liquid state. It is non-combustible, non-explosive, harmless, and safe for transportation. It will not deteriorate in quality, nor soil nor corrode the engine or apparatus wherein used. It can be used from the engine through hose in the same manner as ordinary water, and handled likewise.

I claim to be the sole inventor of the above-described fire-extinguishing compound, in use now in France, and for which I have received and hold French Letters Patent No. 102,282, issued to me for the compound on the 18th day of February, 1874.

What I claim is—

The herein-described fire-extinguishing compound, consisting of a mixture of calcium chloride, alum, having a potash base, and water, substantially as herein set forth.

New York, August 21, 1876.

FRANCOIS CHARLES ZAPFLE.

Witnesses:
J. H. STAATS,
J. H. LUCKHARD.